United States Patent
Keefover et al.

(10) Patent No.: US 7,064,508 B2
(45) Date of Patent: Jun. 20, 2006

(54) ACTUATOR POSITION CONTROL SYSTEM

(75) Inventors: Robert D. Keefover, Lake Orion, MI (US); Joseph A. Wilson, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 11/195,907

(22) Filed: Aug. 3, 2005

(65) Prior Publication Data

US 2006/0049789 A1    Mar. 9, 2006

Related U.S. Application Data

(60) Provisional application No. 60/608,308, filed on Sep. 9, 2004.

(51) Int. Cl.
*H02K 17/32* (2006.01)
(52) U.S. Cl. .................. 318/434; 318/432; 318/433
(58) Field of Classification Search ............ 318/434, 318/432, 560, 567, 466, 569, 649, 609, 610
See application file for complete search history.

(56) References Cited

U.S. PATENT DOCUMENTS

| | | | |
|---|---|---|---|
| 6,157,888 A | 12/2000 | Suzio et al. | |
| 6,289,874 B1 | 9/2001 | Keefover | |
| 6,435,169 B1 | 8/2002 | Vogt | |
| 6,683,429 B1 | 1/2004 | Pringle et al. | |
| 2005/0088133 A1* | 4/2005 | Ebihara et al. | 318/649 |
| 2005/0114004 A1* | 5/2005 | Bansbach et al. | 701/67 |

* cited by examiner

*Primary Examiner*—Karen Masih
(74) *Attorney, Agent, or Firm*—Warn, Hoffmann, Miller & LaLone, P.C.; Greg Dziegielewski

(57) ABSTRACT

A method of using algorithmic control to operate and protect an actuator. The first control strategy uses a soft stop control method where an actuator is driven toward a stop. The actuator control system senses when the actuator is nearing the stop. A control strategy is implemented where the actuator movement is dampened prior to reaching the stop so that the actuator does not strike the stop abruptly. Another control strategy of the present invention involves using the actuator control system to monitor and calculate the integral value of the electrical current flowing though the actuator to determine if the actuator is operating beyond on its suggested operating range. This strategy will help to maximize actuator operation while preventing damage due to overheating.

22 Claims, 2 Drawing Sheets

ACTUATOR POSITION CONTROL SYSTEM

CROSS-REFERENCE TO RELATED APPLICATIONS

This application claims the benefit of U.S. Provisional Application No. 60/608,308, filed Sep. 9, 2004. The disclosure of which is incorporated herein by reference.

FIELD OF THE INVENTION

The present invention relates generally to an actuator position control system and more specifically to an actuator that could benefit from having motor overheat or soft stop algorithmic controls.

BACKGROUND OF THE INVENTION

In the automotive field there are many systems that use electrically powered actuators for controlling various engine parameters. For example in the context of exhaust gas recirculation valves (EGR) often a motorized actuator is used to open and close the recirculation valve at various times throughout the engine cycle. In vehicles with turbo systems a motorized actuator is used to control the actuation of the turbo valve thus enabling the turbo rotor to spin. Actuators can also be found in other systems such as transmission systems, wherein an actuator such as a solenoid is used to control the flow of hydraulic fluid throughout the transmission system. Motorized actuators are also used in gearshift systems for controlling the shifting of gears in both manual and automatic transmissions. More recently, there has been a trend to incorporate electronic throttle control actuators in order to replace the conventional mechanical means of controlling throttle bodies. Electrical throttle control systems use an electronic actuator for controlling the position of the throttle body relative to the position of the accelerator pedal. All the above systems share a common need to protect their respective electronic actuators from damage and excessive wear caused by factors such as overheating and abruptly striking mechanical stops during device operation.

Thus it is desirable to have control systems for each of these actuators that are capable of reducing motor stress and damage by preventing the overuse of the motor.

SUMMARY OF THE INVENTION

The present invention is directed to a method of protecting an actuator by monitoring conditions in a circuit having an input and an output with a first characteristic flowing through the circuit between the input and the output. The first characteristic has a value that can fluctuate over a period of time. The circuit also has a controller that controls the flow of the first characteristic in response to one or more limit reference values or target values. The circuit operates by detecting and monitoring the value of the first characteristic using the controller. The controller generates a range of signal values each corresponding to the value of the first characteristic at a given time. The controller then calculates an integral value from the range of signal values. The integral value is compared to one or more limit reference or target values to determine if the motor is exceeding any of its predetermined limits, such as whether or not the motor is overheating and incurring damage. If it is determined that the integral value is too high than a control algorithm is activated that has a lower cool down limit reference value. The controller reduces the amount of current flowing through the motor for a period of time until the integral value is equal to or less than the lower cool down limit reference value. Once this occurs the system will reset itself and the limit reference value will return to a higher value and the controller will no longer inhibit the amount of current flowing through the motor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

While the present embodiment describes using the control algorithms described herein with an electronic throttle control actuator, it is within the scope of this invention to incorporate the control algorithms for both soft stop and motor overheat with any type of actuator. For example in the automotive field the control algorithms described herein can be used to protect actuators used in transmissions, gear shifts, exhaust gas recirculation systems and turbo systems. All of the above systems incorporate actuators that include both AC and DC motors and can include but certainly not be limited to both brush and brushless DC motors, servo motors, solenoids and torque motors. All of the above actuators are linked with mechanical components that are controlled by the movement of the actuator.

Figure 1:
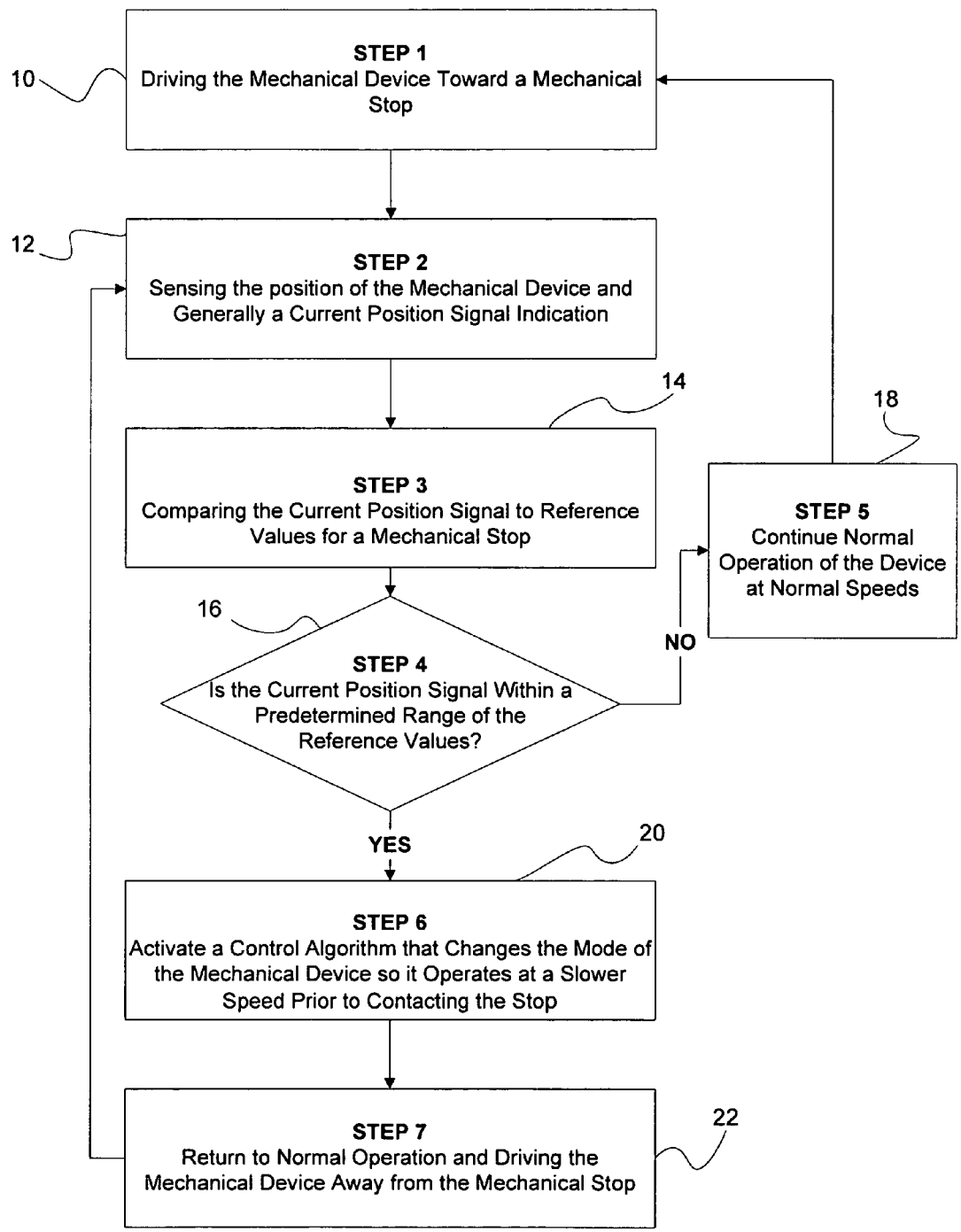
FIG. 1 is a flow diagram depicting the operation of the soft stop control algorithm.

FIG. 1 depicts a flow diagram of the control algorithm for providing soft stop control of the mechanical throttle control device. A mechanical throttle control device typically has a throttle body with a butterfly valve rotatably disposed within an orifice of the throttle body. The butterfly valve rotates with the rotation of a throttle shaft. There are generally two mechanical stops provided on the valve body which prevent the throttle shaft from rotating 360 degrees. These mechanical stops will allow the butterfly valve portion to move from a closed position where the butterfly valve completely covers the opening in the throttle body to a fully open position where the butterfly valve is moved to an approximately perpendicular plane with respect to the butterfly valve's fully closed position. The fully closed position has a first mechanical stop that prevents the butterfly valve from rotating past the fully closed position and a second mechanical stop which prevents the butterfly valve from rotating past the fully open position. One of the problems addressed by this invention is to prevent the components of the throttle valve from striking the first or second mechanical stops at a high velocity which can damage the control components. In an ETC setting it is desirable to prevent the portions of the throttle valve from forcefully contacting or striking the mechanical stops by using non-mechanical means.

The present embodiment of the invention sets forth a method of using a control algorithm for sensing the position of the throttle valve and controlling the speed at which the throttle valve moves over its range of motion. Referring now to FIG. 1 there is provided a first step 10. First step 10 includes driving the mechanical device toward a mechanical stop. The mechanical stop can be either the first stop (valve fully closed position) or a second stop (valve fully open position). During the first step 10 the throttle valve is driven under normal operation and normal operating speeds.

A second step 12 of FIG. 1 provides for sensing the position of the mechanical device (the throttle valve position) and converting the position to a current position signal. Sensors are used in conjunction with the throttle body to sense the position of the valve plate. Sensor types can include Hall Effect sensors, induction sensors as well as any other type of contact or non-contact sensors. The sensors function to convert the position of the butterfly valve plate by assigning it a signal value that is called the current position signal. The current position signal is transmitted to a comparator.

At third step 14 the current position signal is compared to reference values. The comparator has a look up table with preprogrammed reference values that represent signal values indicative of the location of the mechanical stop.

When the current position signal is compared to reference values, the comparator will carry out a fourth step 16 of the method, where the comparator determines whether the current position signal is within a predetermined range or error of the reference values for the mechanical stop. If the current position is not within the predetermined range of the reference values the system carries out a fifth step 18 where the throttle control valve will continue normal operation of the device at normal speeds and steps one through four 10, 12, 14, 16 will be repeated.

If the fourth step 16 determines that the current position signal is within a predetermined ranged of the reference signal values then a sixth step 20 is executed and a control algorithm is activated within a controller so that the mechanical device operates at a slower speed prior to contacting the stop. Once the throttle valve moves in the opposite direction a seventh step 22 returns the throttle valve to normal operation and drives the throttle in a direction away from the mechanical stop. The system will reset itself and the second step 12 is carried out causing the system to begin sensing the position of the mechanical device.

Below is a sample algorithmic code and table of variables that outline one possible algorithm for carrying out the soft-stop embodiment of the invention.

Variables

| Name | Type | Comments |
| --- | --- | --- |
| Enable_SOFT | Cal | Flag to enable/disable this algorithm |
| Soft_Margin_Lower | Cal | Lower Target Position Kick in Value |
| Soft_Margin_Upper | Cal | Upper Target Position Kick in Value |
| Soft_Margin_Error | Cal | Allowable Error to Soft Margin Position before initiating soft driving routine |
| Soft_Rate_Limit | Cal | Max rate of change of target position when near mechanical stops (0.2/sec typical ~ 0.0002 for a 1 msec loop time) |
| MODE | int | Current Mode of Operation |
| PC_Lower_Limit | REF | |

-continued

Variables

| Name | Type | Comments |
| --- | --- | --- |
| PC_Upper_Limit | REF | |
| Position Target | REF | This Routine Modifies this Reference Variable |
| Error/_Last | REF | |

General Algorithm Layout

General Algorithm Layout

```
MODE: NORMAL
if (Position Target < PC_Lower_Limit + Soft_Margin_Lower)
    MODE=DRIVE_TO_POSITION
Else if (Position_Target > PC_Upper_Limit - Soft_Margin_Upper)
    MODE=DRIVE_TO_POSITION
MODE: DRIVE_TO_POSITION
if (Position_Target < PC_Lower_Limit + Soft_Margin_Lower)
    if (abs(Error) < Soft_Margin_Error)
        MODE = SOFT_DRIVE
    else
        Position_Target = PC_Lower_Limit + Soft_Margin_Lower
else if (Position_Target > PC_Upper_Limit - Soft_Margin_Upper)
    if (abs(Error) < Soft_Margin_Error)
        MODE = SOFT_DRIVE
    else
        Position_Target = PC_Upper_Limit - Soft_Margin_Upper
Else
    MODE=NORMAL
MODE: SOFT_DRIVE
if (Position_Target < PC_Lower_Limit + Soft_Margin_Lower)
    If (Target_Position - Target_Position_Last > Soft_Rate_Limit)
        Target_Position = Target_Position_Last + Soft_Rate_Limit
    If (Target_Position - Target_Position_Last < - Soft_Rate_Limit)
        Target_Position = Target_Position_Last - Soft_Rate_Limit
elseif (Position_Target > PC_Upper_Limit - Soft_Margin_Upper)
    If (Target_Position - Target_Position_Last > Soft_Rate_Limit)
        Target_Position = Target_Position_Last + Soft_Rate_Limit
    If (Target_Position - Target_Position_Last < - Soft_Rate_Limit)
        Target_Position = Target_Position_Last - Soft_Rate_Limit
Else
    MODE = NORMAL
```

Figure 2:
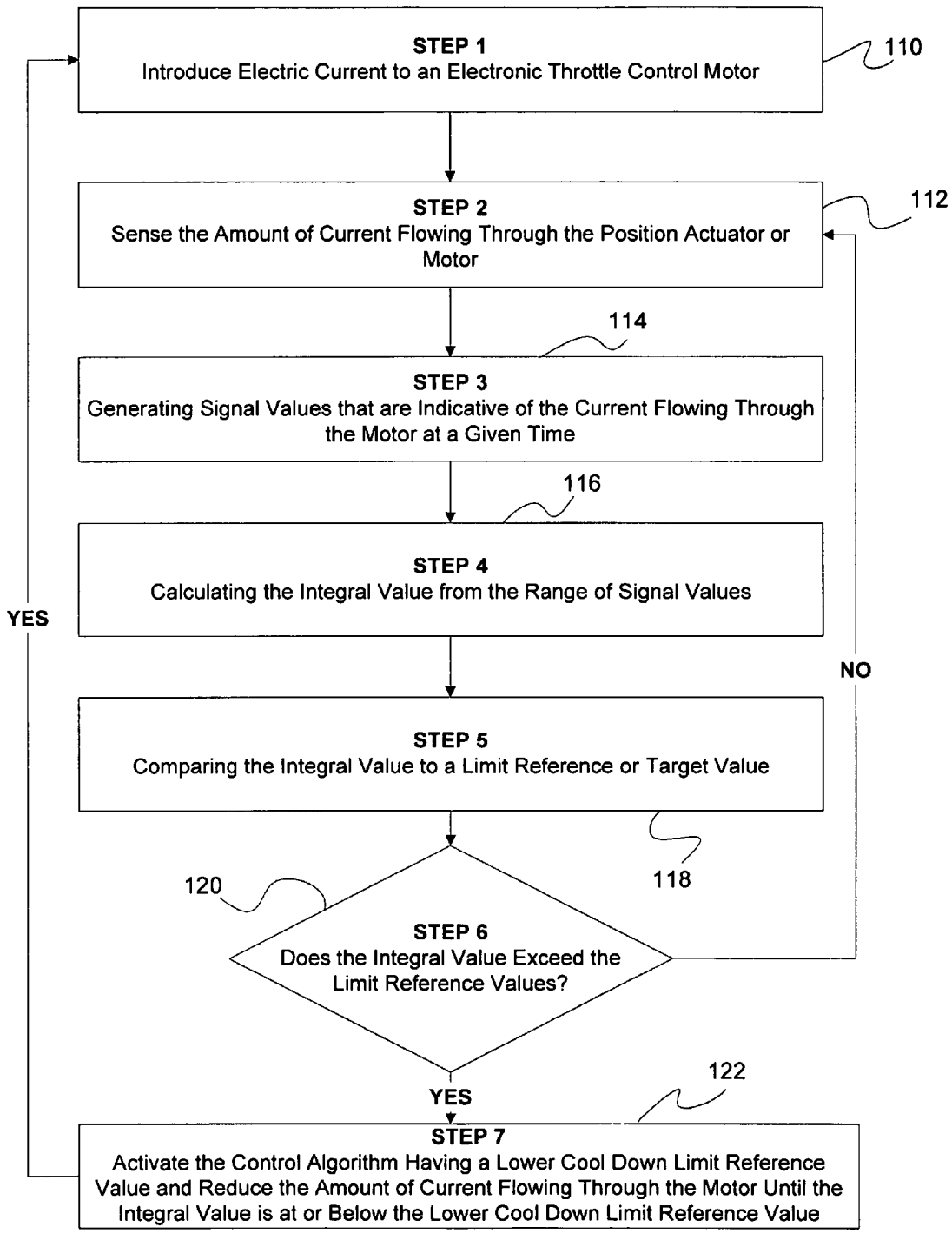
FIG. 2 is a flow diagram of the motor over heat control algorithm.

FIG. 2 depicts a flow chart diagram for a control algorithm for preventing motor overheat in an electronic throttle control system. The first step 110 includes introducing an electric current to the motor for the driving valve between the open and closed position.

The second step 112 includes using a sensor connected to a motor to constantly sense the amount of current flowing through the motor or position actuator. The sensors also perform a third step 114 of generating a range of signal values that are indicative of the current flowing through the motor at a given time.

The range of signal values are sent to a comparator that carries out a fourth step 116 of calculating the integral value of the range of signal values generated by the sensors at step 114. The comparator also carries out a fifth step 118 of comparing the integral value to a limit reference value that is an integral value that represents the operational threshold of the motor. The limit reference value represents the amount of work that the motor can perform until the motor starts to overheat and sustain damage. The limit reference value and the integral value can be any value and it is also contemplated that this value can hold the value of zero. The limit reference value can also be set at a level that is lower than the threshold of the motor. For example, the method described herein specifies that the limit reference value can take on a "cool down" limit reference value which may be used to limit the amount of current flowing through the motor for a set period of time while the motor cools off and recovers from a potential overheat situation.

The comparator then examines and will then carry out a sixth step 120 of determining whether the integral value exceeds the limit reference value. If the integral value does not exceed the limit reference value then steps one through six 110, 112, 114, 116, 118, 120 are repeated. If the integral value exceeds the limit reference value established in the fifth step 118, then the controller will carry out a seventh step 122. During the seventh step 122 the controller will activate a control algorithm that sets the limit reference value to a lower "cool down" limit reference value. Simultaneously the controller will reduce the amount of current flowing through the motor for a period of time until the integral value drops and is equal to or below the lower "cool down" limit reference value. This process allows for the actuator to continue operating at a lower capacity while protecting the motor from damage that could be sustained if current is allowed to continue to exceed the threshold set by the limit reference value established in the fifth step 118. It should be noted that the limit reference value in the fifth step 118 and the lower "cool down" limit reference in the seventh step 122 as well as the integral value calculated in the fourth step 116 can be any type of value including the value of zero. Once the set cool down period has lapsed the control algorithm resets itself and the system starts at the first step 110 as the process described in FIG. 2 above is repeated.

It should be noted that the method shown in FIG. 1 and FIG. 2 both have a second step 12, 112 respectfully, that describes the use of sensor devices that operate by sensing current flow through an actuator. It is possible to carry out both methods described herein by determining actuator position as well as motor overheat virtually based on other parameters. Using a virtual detection system would be helpful in the event that there is a system failure. For example, a system failure can only occur if a sensor failed and it was no longer possible to sense throttle plate position or the amount of voltage applied to the motor. A virtual system would act as a backup using data from other sensors to operate the controller. For instance throttle position could be determined using a motor overheat sensor, which could indicate the direction and the amount of time a current has been flowing through the motor. Thus the throttle plate position could be estimated based on these parameters. With regard to the motor overheat method, data could be inputted from the throttle position sensor that would indicate the length of time and amount of current flowing through the system (i.e., the motor) based upon the position of the throttle. Both of the above described virtual systems would involve extrapolating the position of the mechanical device from the second step 12 and/or determining the amount of current flowing through a position actuator in the second step 112 using data inputted from other sources. While the above description of virtual systems specifically mention using the throttle position motor overheat sensors to generate data, it is within the scope of this invention use any sensor in the vehicle that can be used to extrapolate data for use in the methods described herein.

Below is a sample algorithmic code and table of variables that outline one possible algorithm for carrying out the current limiting embodiments of the invention.

Variables

| Name | Type | Comments |
| --- | --- | --- |
| Motor_Current_Enable | Cal | Manual Enable/Disable Flag of Current Limiting Routine |
| Motor_Current_Peak_Limit | Cal | Target Peak Motor Current |
| Motor_Current_Avg_Limit | Cal | Target Average Motor Current (example 2.5 amps) |
| Motor_Current_Backoff | | Back-off Current when in Limiting Mode (example 2.0 amps) |
| Current_I | Cal | Integral Coefficient |
| Motor_I_Lower_Limit | Cal | Limit to prevent Integral "Wind-Up" |
| Motor_I_Upper_Limit | Cal | Limit to prevent Integral "Wind-Up" |
| Motor_I_Fault_ON | Cal | Integral Fault ("Trigger") Point to Turn On |
| Motor_I_Fault_OFF | Cal | Integral Fault ("Trigger") Point to Turn Off |
| Motor_Decay_Coef | Cal | Current Decay Coefficient (Set this to 1 to have no essentially decay function) |
| Motor_Current_Limit_I | Var | Motor Current − Limit Integral |
| Motor_Current_Limit | Var | Difference to Specified Average Limit |
| Motor_Limit_Mode | Var | Flag for Active Current Limit Function |
| Output_Current_Limit | Var | Calculated Target Motor Current Limit |
| Motor_Current | IO | Measured Motor Current |

General Algorithm Layout

General Algorithm Layout

```
Output_Current_Limit_Last = Output_Current_Limit
Motor Average Current Integrator
Motor_Current_Limit = abs(Motor_Current) − Motor_Current_Avg_Limit
Motor_Current_Limit_I = Motor_Current_Limit_I + Motor_Current_Limit * Current_I
If (Motor_Current_Limit_I < Motor_I_Lower_Limit) then Motor_Current_Limit_I =
Motor_I _Lower_Limit
If (Motor_Current_Limit I > Motor_I _Upper_Limit) then Motor_Current_Limit_I =
Motor_I _Upper_Limit
If (Motor_Current_Limit_I > Motor_I_Fault_ON) then Motor_Limit_Mode = "ON"
Active Current Limiting Routine
If (Motor_Limit_Mode = "ON") AND (Motor_Current_Enable="ON")
    If (Motor_Current_Limit_I < Motor_I_Fault_OFF) then
        Motor_Limit_Mode = "OFF"
        Output_Current_Limit = Motor_Current_Peak_Limit
    Else
        Output_Current_Limit = Output_Current_Limit_Last + (Motor_Current_Backoff −
           Output_Current_Limit_Last) * Motor_Decay_Coef
```

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control method comprising the steps of:
   providing a circuit having an input and an output;
   providing a first characteristic within said circuit between said input and said output, wherein said first characteristic has a value that may fluctuate over a period of time;
   providing a controller that controls the flow of said first characteristic; wherein said controller has one or more limit reference values;
   detecting and monitoring said value of said first characteristic using said controller;
   generating a range of signals each corresponding to said value at a given time;
   calculating a value from said range of signal values; and
   comparing said integral value to said one or more limit reference values.

2. The method of claim 1 further comprising the step of blocking said first characteristic from flowing through said circuit when said value exceeds said one or more limit reference values.

3. The method of claim 2 wherein an algorithm is encoded on said controller, wherein said algorithm controls said steps of detecting, generating, calculating, comparing and blocking.

4. The method of claim 1 further comprising the step of adjusting said value of said first characteristic downward when said value exceeds said one or more limit reference values.

5. The method of claim 1 wherein said controller has a sensor portion for detecting said value of said first characteristic and transmits said range of signals to a control portion that calculates said values and compares them to said one or more current limit reference values.

6. The method of claim 1 wherein said input is a power supply and said output is an electric motor.

7. The method of claim 6 wherein said first characteristic is any one of the group consisting of electric current, voltage, resistance, capacitance, Daltons, Joules, Watts or Newtons and said value is a unit value of said first characteristic.

8. The method of claim 1 wherein said sensor is a virtual sensor that uses values from other sensors to determine a value for said first characteristic.

9. A method of providing motor average current protection comprising the steps of:
   providing a circuit having an input connected to a power supply and an output connected to a motor;
   providing a first characteristic flowing through said circuit between said input and said output, wherein said first characteristic has a current value that may fluctuate over time;
   providing a sensor connected to said circuit;
   providing a controller connected to said sensor, wherein said controller has one or more limit reference values encoded in said controller;
   detecting and monitoring said value of said characteristic using said sensor;
   generating a range of signal values corresponding to said value at a point in time;
   transmitting said range of signal values to said controller;
   calculating an integral value from said range of signal values; and
   comparing said integral value to said one or more limit reference values.

10. The method of claim 9 further comprising the step of blocking said first characteristic from flowing through said circuit when said integral value exceeds said one or more limit reference values.

11. The method of claim 9 wherein an algorithm is enclosed on said controller, wherein said algorithm controls said steps of detecting, generating, calculating, comparing and blocking.

12. The method of claim 9 further comprising the step of adjusting said value of said first characteristic downward when said integral value exceeds said one or more limit reference values.

13. The method of claim 9 wherein said controller has a sensor portion for detecting said value of said first characteristic and transmits said range of signals to a control portion that calculates said integral values and compares them to said one or more current limit reference values.

14. The method of claim 9 wherein said input is a power supply and said output is an electric motor.

15. The method of claim 14 wherein said first characteristic is any one of the group consisting of electric current, voltage, resistance, capacitance, Daltons, Joules, Watts or Newtons and said value is a unit value of said first characteristic.

16. The method of claim 9 wherein said sensor is a virtual sensor that uses values from other sensors to determine a value for said characteristic.

17. A method of creating a soft stop for a control system that controls a mechanical device comprising the steps of:
    providing a mechanical device having an operating range defined by one or more stops;
    providing a controller device for controlling said mechanical device, wherein said controller has a sensor;
    providing a control algorithm encoded in said controller;
    constantly sensing the position of said mechanical device in said operating range using a sensor and transmitting said position to said controller;
    controlling the speed and said position of said mechanical device using said controller; and
    executing said control algorithm encoded in said controller so that said mechanical device is driven at a first speed toward said one or more stops and when said mechanical device reaches a predetermined distance from said one or more stops, said mechanical device is driven at a second speed that is slower than said first speed until said mechanical device contacts said one or more stops.

18. The method of claim 17 wherein said one or more stops comprise a first stop at a first end of said operating range and a second stop at a second end of said operating range.

19. The method of claim 18 further comprising one or more intermediate stops located between said first stop and said second stop.

20. The method of claim 19 wherein said control algorithm is executed when said mechanical device is driven toward any one of said one or more intermediate stops.

21. The method of claim 20 further comprising the steps of:
   driving said mechanical device in a second direction at said first speed; and
   executing said control algorithm encoded in said controller so that said mechanical device is driven at a first speed toward said one or more stops and when said mechanical device reaches a predetermined distance form said one or more stops, said mechanical device is driven at a second speed that is slower than said first speed.

22. The method of claim 17 wherein said sensor is a virtual sensor that uses values from other sensors to determine a value for said position of said controller.

* * * * *